United States Patent Office 3,357,499
Patented Dec. 12, 1967

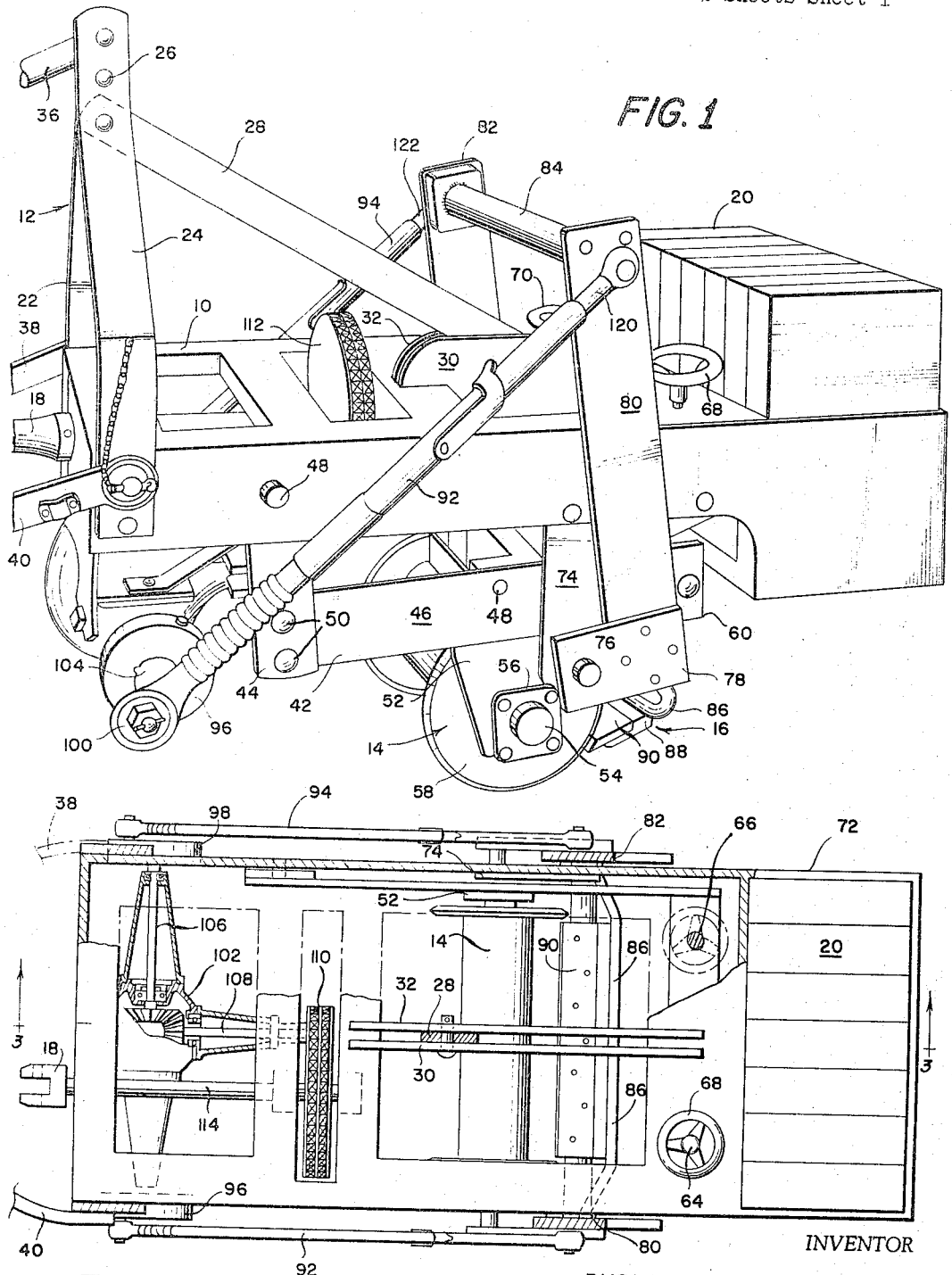

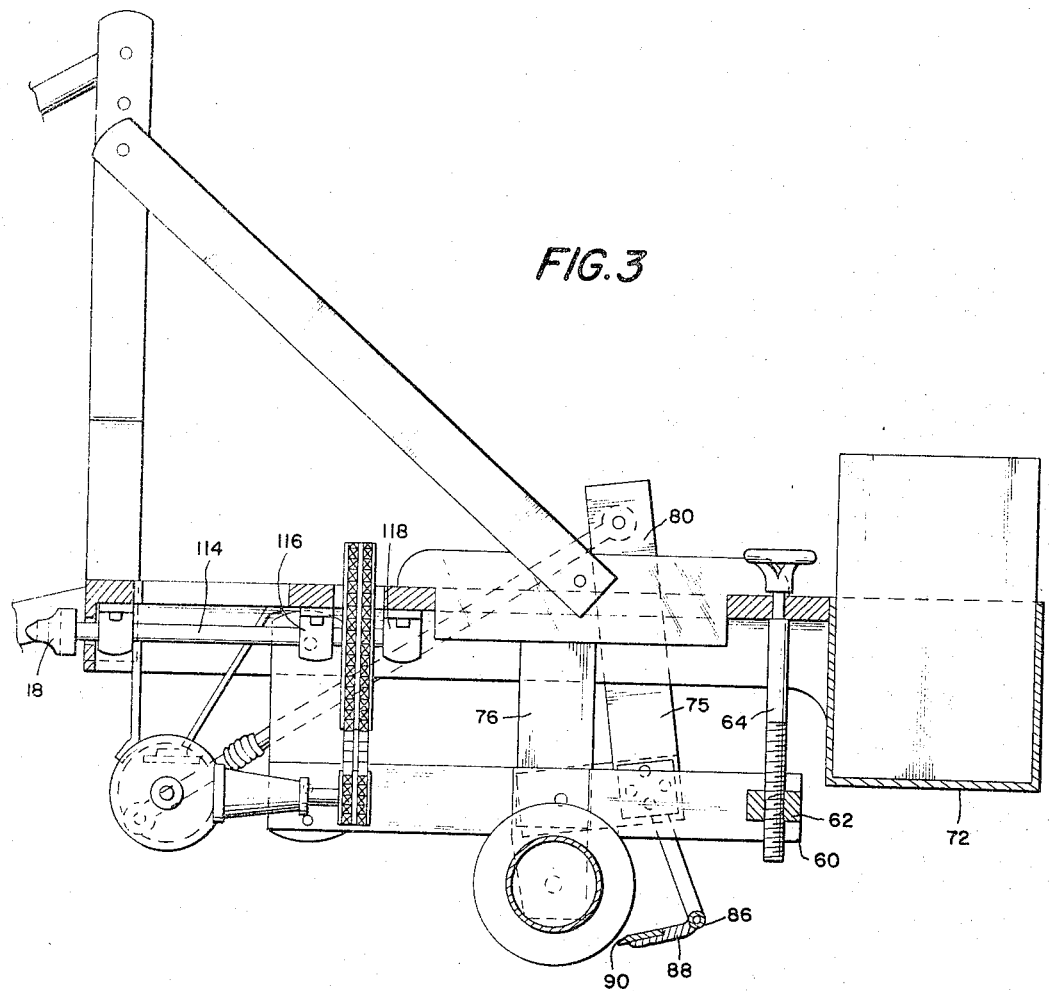
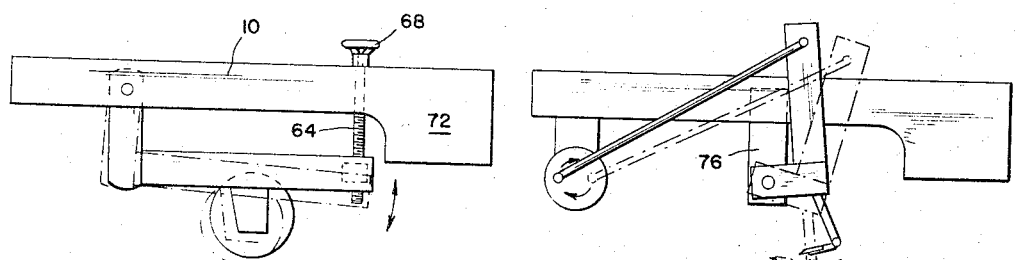

3,357,499
TURF CUTTER
Dudley W. Finneyfrock, Box 35, Olney, Md. 20832
Filed Sept. 25, 1964, Ser. No. 399,189
2 Claims. (Cl. 172—19)

The present application pertains to a turf cutting device of the type conventionally pulled by a tractor and embodying a cutter roller engaging the turf or sod and a transverse cutter blade pivoted longitudinally beneath the sod and within the path of advancement of the cutter roller.

Previous inventors of turf cutting devices have devised complex ground engaging rollers which are employed together with transverse cutter blades. Sometimes the transverse cutter blades have been pivoted so as to enhance ground cutting action. However, there has not been provided a simple, rugged mechanism for simultaneously defining parallel longitudinal cuts in the sod while sequentially undercutting the sod between these longitudinal cuts. According to the present inventions, a cutter roller with parallel cutter blades at its opposed ends is suspended beneath a frame by means of a vertically, adjustable pivoted yoke. A transverse cutter bar is pivoted to the rear of the cutter roller in this frame and oscillated forwardly and rearwardly within the longitudinal plane of advancement of the cutter roller blades. Since means are provided for vertically adjusting the angle of pivotability of the cutter roller yoke with respect to the ground and there are provided means for varying the angle of pivot of the cutter blade with respect to cutter rollers, there may be obtained a very precise presentation of the cutter elements with respect to the sod being cut. Applicant's device although simple mechanically is enabled to be adjusted for effective cutting of soil in any condition. This is an extremely beneficial characteristic, since sod production necessitates cutting of the sod throughout the year when the soil is in various conditions. Also, because of this fine adjustability applicant's device is enabled to attack the sod without respect to the undesirable foreign matter such as sticks, rocks, manure, and like elements which generally interfere with a sod-cutting operation.

Accordingly, it is an object of invention to provide a turf cutter which is adaptable to turf cutting under any soil conditions.

Yet another object of invention is to provide turf cutter embodying a uniquely adjustable cutter roller and turf cutter blade.

Yet, additional objects of invention will become apparent from the ensuing specification and attached drawings wherein:

FIGURE 1 is a perspective of the proposed cutting device with a tractor three-point hitch means 12 mounted at its forward end, optional weights 20 supported at its rear end, cutter roller 14 rotatably suspended beneath the frame and cutter blade 16 pivoted in the path of advancement of the cutter blade;

FIGURE 2 is a top plan thereof;

FIGURE 3 is a vertical section;

FIGURE 4 is a schematic elevation partially in phantom, showing the degree of adjustability of the cutter roller yoke with respect to the frame from which it is pivoted;

FIGURE 5 is a schematic partially in phantom showing the pivoting effect of the cutter blade by means of the forwardly mounted eccentric drive.

In FIG. 1 the turf cutter device is illustrated as comprising a frame 10, having a three-point hitch connecting means 12 at its forward end, a cutter roller 14 pivotably supported beneath the frame and an oscillating cutter blade generally designated as 16 pivoted to the rear of the cutter roller 14.

As illustrated in FIGS. 1 and 2 a power take-off 18 may be connected to an external source of power, such as a driving tractor. At the rear of the frame a box 72 is provided for the optional insertion of a cement or like weights 20, depending on the soil characteristics. The three-point connecting means 12 comprises upstanding legs 22 and 24 secured at their upper ends by means of bolt 26 and braced by strut 28 extending rearwardly where it is supported by support plates 30 and 32. Top hitch element 36 is connected by bolt means to top of legs 22 and 24 and the bottom side three-point elements 36 and 38 may be releasably connected by cotter pin means, as illustrated. Cutter roller yoke 42 embodies vertically depending legs 44 connected to horizontal member 46 by means of bolt 50. The entire yoke is pivoted at its forward end by means of studs 48. The actual cutter roller drum 52 is supported rotatably at the rear or free end of horizontal member 46 by means 8 and support axle 54 mounted in like bearing plates 56. The cutter roller 14 embodies opposed blades 58 which make parallel longitudinal cuts in the sod. At the open end 60 of yoke 42 there is supported a transverse plate 62, as particularly illustrated in FIG. 3. Identical vertical adjusting shafts 64 and 66 embodying top hand wheels 68 and 70 respectively extend through the top of frame 10 and engage plate 62 as illustrated in FIG. 4 so as to vary the angle of pivot or cut of the cutter roller blades with respect to frame 10 itself.

Transverse cutter blade 90 is suspended, as illustrated particularly in FIGS. 2 and 3, intermediate the cutter roller blades 58 upon blade support piece 88 in turn welded to a U-shaped cutter roller bar 86 which depends from securing pieces, 80 and 82. Horizontal piece 78 in turn is connected at the bases of pieces 80 and 82 and are pivoted about stud 76 which extends into vertically dependent pieces 75 and 74. Pitman members 92 and 94 embodying threaded telescoping members 120 and 122 extend from bar 84 mounted intermediate the top of members 88 and 82 into eccentric drive wheels 96 and 98 to which they are secured by means of grease type self aligning bearings 100. Eccentrics 96 and 98 are mounted upon respective drive shaft 104 and 106 extending into differential 102 in turn driven by drive shaft 108 which is driven by double row heavy duty chain 110 extending about drive shaft sprocket (not illustrated) and upper sprocket 112 connected by shaft 114 to power take-off 18. Shaft 114 is secured in frame 10 by means of brackets 116 and 118.

As will be apparent by turning hand wheels 68 and 70 the angle of attack of cutter wheels may be varied. Also, as an adjustment feature by longitudinally adjusting the pitman members 92 and 94 the degree of pivot of blade 90 with respect to the cutter rollers may be finely adjusted.

In a typical installation cutter roller blades 58 may be 12 or 16 inches apart. Frame 10 may be 50 inches wide with a width of 36 inches and an overall height of 46 inches. The transverse cutter blade 90 may be driven 540 strokes per minute by means of an engine 1,800 r.p.m. By turning hand wheels 68 and 70 so as to raise the cutter roller towards the frame 10 as illustrated in FIG. 4 the transverse cutter blade is increasingly exposed to the turf being cut with the result that a deeper cut or depth of sod is cut. During spring cutting conditions when the turf is soft, the pitman members 92 and 94 embodying left and right hand threads may have their extension pieces 120 and 122 lengthened so that the cutter blade is pivoted towards an increasingly horizontal presentation. In the fall when the turf is dry, the opposite effect may be achieved by shortening the pitmans so that a cutter blade 90 is not horizontally presented but presented at an increasing angle with respect to the turf being cut.

Manifestly various changes in working components and arrangement of parts may be employed without departing from the spirit and scope of the invention, as defined in the sub-joined claims.

I claim:
1. In a turf cutting device of the type including a frame having a rear end weight-supporting component, turf engaging means rotatably suspended beneath said frame, and a transverse cutter blade connected to said power take-off the combination of:
 (A) a ground engaging cutter roller rotatably pivoted beneath said frame and
  (i) being revolvably mounted in a cutter roller yoke pivoted at its forward end to said frame and having at its rear free end a vertical adjusting piece engaging said frame;
   and including means adjusting the angle of pivotability of said cutter roller with respect to said frame; and
  (ii) a pair of parallel blades aligned so as to define therebetween a cutting path in said turf and said transverse cutter blade extending between said parallel blades;
 (B) a pivoted transverse cutter blade connected to said power take-off and pivoted in said frame in rear juxtaposition with said cutter roller so as to pivot into and out of the path of longitudinal cut made by said roller; and
 (C) a power take-off shaft supported in said frame extending to an external source of power at one end and at its other end engaging a sprocket rotatably supported in said frame; a differential supported in said frame and powering eccentric shafts at either side, said differential being connected to said sprocket by chain means and a differential shaft.

2. A turf cutting device as in claim 1, including pitman means interconnecting said eccentric drive and said cutter blade so as to vary the longitudinal pivoting of said cutter blade with respect to said cutter roller.

References Cited

UNITED STATES PATENTS

| 2,534,838 | 12/1950 | Wall | 172—19 |
| 2,617,347 | 11/1952 | Provost | 172—20 |
| 2,682,824 | 7/1954 | Bowser et al. | 172—19 |
| 2,897,901 | 8/1959 | Grube et al. | 172—20 |

FOREIGN PATENTS 26,540    1913    Great Britain.

ABRAHAM G. STONE, *Primary Examiner.*

J. R. OAKS, *Assistant Examiner.*